United States Patent
Elyashev et al.

(10) Patent No.: US 8,566,650 B2
(45) Date of Patent: Oct. 22, 2013

(54) VIRTUAL MACHINE INFRASTRUCTURE WITH STORAGE DOMAIN MONITORING

(75) Inventors: Vitaly Elyashev, Ramat Gan (IL); Omer Frenkel, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 351 days.

(21) Appl. No.: 12/535,534

(22) Filed: Aug. 4, 2009

(65) Prior Publication Data

US 2011/0035620 A1 Feb. 10, 2011

(51) Int. Cl.
*G06F 11/00* (2006.01)
(52) U.S. Cl.
USPC ............................................................. 714/48
(58) Field of Classification Search
USPC ................................................. 714/4.11, 4.12
See application file for complete search history.

(56) References Cited

U.S. PATENT DOCUMENTS

| | | | | |
|---|---|---|---|---|
| 7,356,730 | B2 * | 4/2008 | Ulrich et al. | 714/6.12 |
| 7,434,087 | B1 * | 10/2008 | Singh | 714/4.11 |
| 7,673,169 | B1 * | 3/2010 | Kumaresan et al. | 714/4.4 |
| 2003/0191992 | A1 * | 10/2003 | Kaminsky et al. | 714/712 |
| 2007/0189189 | A1 * | 8/2007 | Andrews et al. | 370/254 |
| 2009/0138752 | A1 * | 5/2009 | Graham et al. | 714/4 |
| 2010/0037089 | A1 * | 2/2010 | Krishnan et al. | 714/5 |
| 2010/0146122 | A1 * | 6/2010 | Prince et al. | 709/226 |
| 2010/0211829 | A1 * | 8/2010 | Ziskind et al. | 714/48 |
| 2010/0251002 | A1 * | 9/2010 | Sivasubramanian et al. | 714/2 |

OTHER PUBLICATIONS

"Solid Ice™ Overview", Apr. 2008, pp. 1-15, Qumranet, Inc.

* cited by examiner

*Primary Examiner* — James Kramer
*Assistant Examiner* — Neil Miles
(74) *Attorney, Agent, or Firm* — Lowenstein Sandler LLP (57) ABSTRACT

A computing device monitors multiple hosts. A first host that does not have access to a data store is identified. A determination is made as to whether other hosts have access to the data store. When the other hosts do have access to the data store, it is determined that the first host is malfunctioning. A host error notification may then be sent to an administrator.

18 Claims, 5 Drawing Sheets

VIRTUAL MACHINE INFRASTRUCTURE WITH STORAGE DOMAIN MONITORING

TECHNICAL FIELD

Embodiments of the present invention relate to monitoring access to network storage by hosts (e.g., hosts of virtual machines), and more specifically to identifying problems in the network storage or the hosts based on the monitoring.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to host services, applications, or other processed. A host machine may simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices.

Host machines are typically connected to some type of storage domain for writing data to and reading data from. Occasionally, a data store (e.g., a storage device or an entire storage domain) may become unreachable by a host machine. In conventional network architectures, it can be difficult and time consuming to determine whether the problem is due to a malfunctioning data store or storage domain, or whether the problem is due to a malfunctioning host machine.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 1 is a block diagram of a computing system, in which embodiments of the invention may operate;

FIG. 2 illustrates a server side of a network architecture, in accordance with one embodiment of the present invention;

FIG. 3 is a flow diagram illustrating a method for one embodiment of identifying and analyzing network storage problems;

FIG. 4 is a flow diagram illustrating a method for another embodiment of identifying and analyzing network storage problems; and FIG. 5 illustrates a block diagram of one embodiment of a computer system.

DETAILED DESCRIPTION

Embodiments of the invention provide for a mechanism for analyzing problems with network storage. In one embodiment, a host controller monitors multiple hosts. Each host may or may not host one or more virtual machines. The host controller identifies a first host that does not have access to a data store. The data store may be a single storage device, or a storage domain that includes multiple storage devices and/or a storage server. The host controller may identify that the first host does not have access to the data store by polling the host or by receiving an automatic update from the host. The host controller determines whether other hosts have access to the data store. When the other hosts do have access to the data store, the host controller determines that the first host is malfunctioning. When the other hosts do not have access to the data store, the host controller determines that the data store is malfunctioning.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "receiving", "identifying", "determining", "migrating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Figure 1:
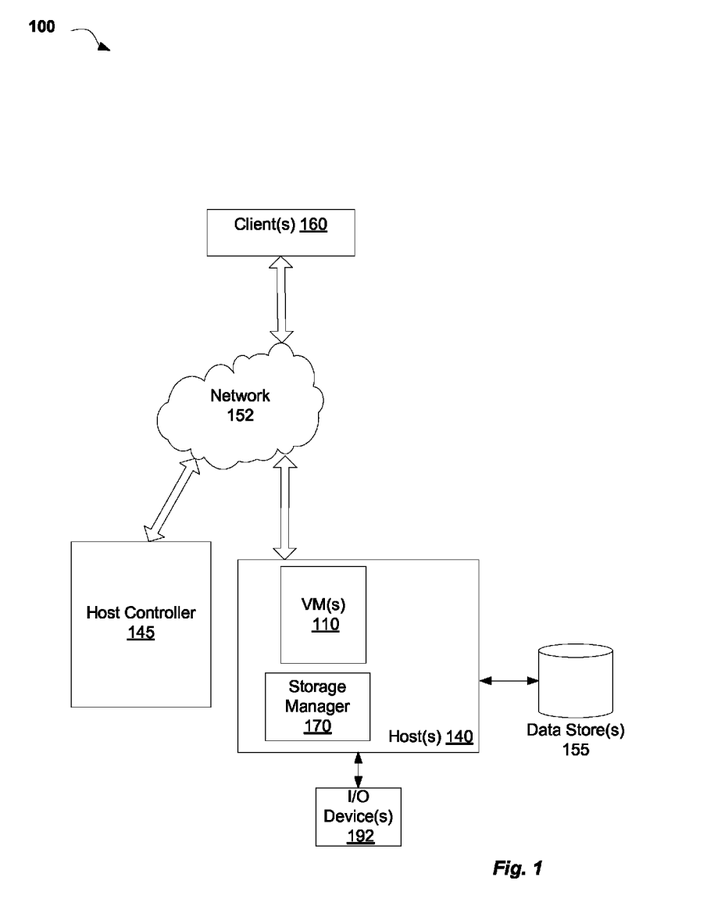

FIG. 1 is a block diagram of a computing system 100, in which embodiments of the invention may operate. The computing system 100 includes, but is not limited to, one or more clients 160 communicatively coupled to one or more hosts 140 or a cluster of hosts 140 over a network 152. The computing system 100 may also include the clients 160 connected with a host controller 145 over the network 152. Network 152 may be a private network (e.g., a local area network (LAN), a wide area network (WAN), etc.) or a public network (e.g., the Internet), and may be a combination of one or more networks.

Each host 140 is a server configured to host one or more services, applications or other processes. One or more hosts 140 may host virtual machines (VM) 110. The host 140 includes a bare platform hardware that may be a personal computer (PC), server computer, mainframe, or other computing system. The platform hardware can include a processor, memory, input/output devices, etc. The host may further include a virtual machine monitor (VMM) (also known as a hypervisor). The VMM, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc.

In one embodiment, the VMM is run directly on bare platform hardware. In another embodiment, the VMM is run on top of a host OS. Alternatively, for example, the VMM may be run within, or on top of, another VMM. VMMs may be implemented, for example, in hardware, software, firmware or by a combination of various techniques.

The VMM presents to other software (i.e., "guest" software) the abstraction of one or more virtual machines (VMs) 110, which may provide the same or different abstractions to various guest software (e.g., guest operating system, guest applications, etc.).

Virtual machines 110 can be, for example, hardware emulation, full virtualization, para-virtualization, and operating system-level virtualization virtual machines. Each virtual machine 110 includes a guest operating system (guest OS) that hosts one or more applications within the virtual machine. The guest OSes running on the virtual machines 110 can be of the same or different types (e.g., both may be Windows operating systems, or one may be a Windows operating system and the other a Linux operating system). More-over, the guest OSes and the host OS may share the same operating system type, or the host OS may be a different type of OS than one or more guest OSes. For example, a guest OS may be a Windows operating system from Microsoft and a host OS may be a Linux operating system available from Red Hat.

In one embodiment, each virtual machine 110 hosts or maintains a desktop environment providing virtual desktops for remote clients (e.g., client 160). A virtual desktop is a virtualized desktop computer, and thus includes storage, an operating system, applications installed on the operating system (e.g., word processing applications, spreadsheet applications, email applications, etc), and so on. However, rather than these functions being provided and performed at the client 160 or I/O device 192, they are instead provided and performed by a virtual machine 110. In other embodiments, virtual machines 110 are not virtual desktops.

In one embodiment, users access virtual machines 110 remotely via clients 160. In another embodiment, users access virtual machines 110 via input/output (I/O) devices 192 that are connected directly to host or cluster of hosts 140. The I/O devices 192 include devices that enable a user to interact with one or more virtual machines 110. The I/O devices 192 may include, for example, a display, a keyboard, a mouse, a microphone, a usb port, a firewire port, and so on.

Each client 160 may be a personal computer (PC), palm-sized computing device, personal digital assistant (PDA), etc. Clients 160 may be fat clients (clients that perform local processing and data storage), thin clients (clients that perform minimal or no local processing and minimal to no data storage), and/or hybrid clients (clients that perform local processing but little to no data storage). In one embodiment, clients 160 essentially act as input/output devices, in which a user can view a desktop environment provided by a virtual machine (e.g., a running instance of an operating system including storage available to the operating system and programs installed and/or running on the operating system) on a monitor, and interact with the desktop environment via a keyboard, mouse, microphone, etc. In one embodiment, a majority of the processing is not performed at the clients 160, and is instead performed by virtual machines 110 hosted by the host 140.

Each VM 110 may communicate with one or more clients 160, one or more applications running on those clients 160, and/or one or more I/O devices 192. Additionally, a single client 160 and/or I/O device 192 may communicate with multiple virtual machines 110. For example, each application running on a client 160 may communicate with different VMs. Alternatively, all of the applications of a client 160 may communicate with a single VM. In one embodiment, there is a one to one correspondence between VMs 110 and clients 160 or I/O devices 192.

Each VM 110 may communicate with an I/O device 192. In one embodiment, VMs 110 communicate with clients and/or client applications using a multichannel protocol (e.g., Remote Desktop Protocol (RDP), Simple Protocol for Independent Computing Environments (SPICE™) from Red Hat, etc.).

The host or hosts 140 are connected to one or more data stores 155. Each data store 155 may be a single storage device, or a storage domain that includes one or more storage devices and/or a storage server for managing the storage devices. The data store 155 may be a storage area network (SAN), a network attached storage (NAS), or a combination thereof. Any changes that are made to services, applications, processes, etc. running on the host 140 (e.g., changes made to a state of a virtual machine 110 during active sessions for the virtual machine) can be stored in the data store 155. Changes made to the state of a virtual machine may include, for example, modification to files within the virtual machine, installation of new programs to a guest OS in the virtual machine, receipt of new email at an email client within the virtual machine, etc. Accordingly, in one embodiment clients 160 need little or no local storage.

The host 140 may be coupled to a host controller 145 (via network 152 as shown or directly). In one embodiment, in which the host controller 145 is directly connected to the host 140, host controller 145 is not connected to clients 160 via network 152. The host controller 145 may monitor and control one or more functions of hosts 140. In one embodiment, the host controller 145 manages virtual machines 110. Host controller 145 may be configured to add a virtual machine, delete a virtual machine, balance the load on the host cluster, provide directory service to the virtual machines, and/or perform other management functions.

In one embodiment, the host controller 145 monitors each of the hosts 140 to determine whether they have access to the one or more data stores 155. If one or more hosts 140 do not have access to the data stores 155, then the host controller 145 may identify whether one or more hosts are malfunctioning and/or whether a data store 155 is malfunctioning. Such functionality is discussed in greater detail below with reference to FIGS. 2 and 3.

Figure 2:
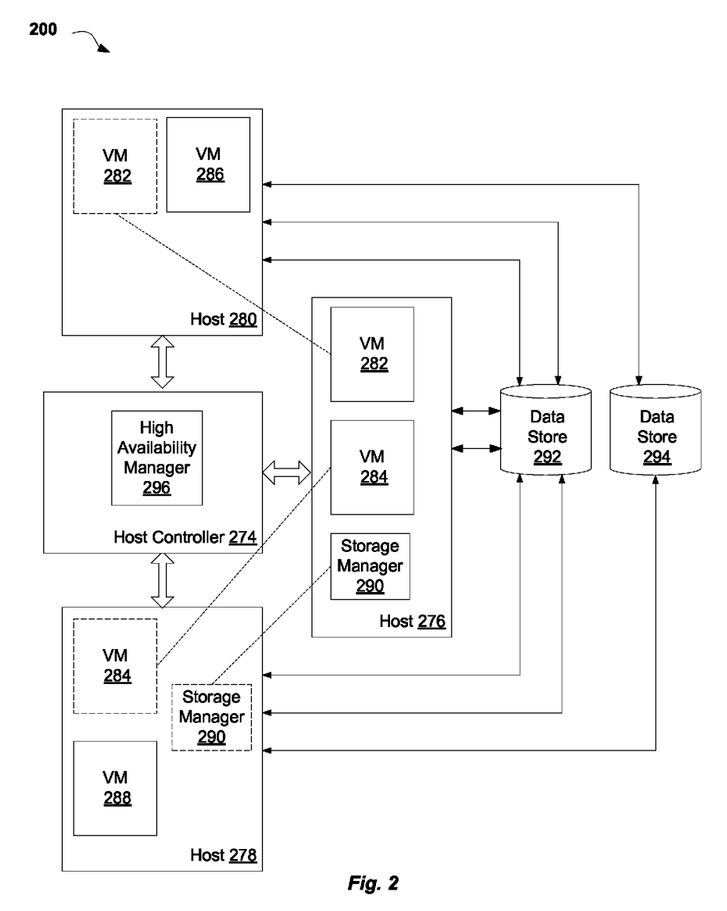

FIG. 2 illustrates a server side network architecture 200, in accordance with one embodiment of the present invention. The server side network architecture 200 in one embodiment is a component of computing system 100 of FIG. 1. The server side network architecture 200 includes multiple hosts 276, 278, 280 connected with a host controller 274 and one or more data stores 292, 294.

The host controller 274 manages each of the hosts 276, 278, 280, and may further manage virtual machines running on the hosts. The host controller 274 may manage one or more of provisioning of new virtual machines, connection protocols between clients and virtual machines, user sessions (e.g., user authentication and verification, etc.), backup and restore, image management, virtual machine migration, load balancing, and so on. The host controller 274 in one embodiment acts as a front end for the hosts. Thus, clients and/or I/O devices log in to the host controller, and after successful login the host controller connects the clients or I/O devices to virtual machines. In another embodiment, clients log directly in to hosts without going through host controller 274.

In one embodiment, the host controller 274 includes a high availability manager 296. The high availability manager 296 may monitor virtual machines running the hosts, and load balance the hosts as necessary. For example, if multiple VMs running on a host suddenly shut down, a load imbalance may occur such that that the host is under-utilized as compared to other hosts. The high availability manager 296 may respond to the load imbalance by migrating virtual machines from hosts that are hosting many virtual machines to the host that is hosting few or no virtual machines to redistribute load. High availability manager 296 may also detect the failure of a host, and migrate the virtual machines (or other applications, processes, etc.) that had been running on the failed host to other hosts. In one embodiment, high availability manager 296 performs live migrations, in which VMs and/or other applications are migrated while they are still running.

In one embodiment, the high availability manager periodically (e.g., every few seconds, every minute, etc.) or continuously polls the hosts to determine statuses of each of the hosts. Alternatively, the hosts may send reports to the host controller 274 without being polled. For example, the hosts may send reports on a periodic basis, or whenever a status of one or more virtual machines on the host changes.

Received poll responses and/or reports include a status of connectivity to one or more data stores 292, 294. For example, a report from host 280 may indicate that host 280 has lost connection to data store 294. In one embodiment, the reporting host can identify whether or not it has a connection to a particular data store 292, 294. Access may be lost, for example, if the data store has failed, if a communication link (e.g., a path) to the data store has failed, if there is a problem with a port of the host, if software or firmware included in the host has malfunctioned, or for other reasons. However, the host may not be able to identify why access to the data store has been lost.

In one embodiment, responses/reports further identify a status of paths to the data stores 292, 294. For example, data store 292 is a multi-path data store that includes two paths to host 280, host 276 and host 278. Data may be sent between each host and data store 292 via either or both of the available paths. If one of the paths becomes disabled, then communications can still be exchanged via the remaining path.

High availability manager 296 aggregates the status information regarding host access (e.g., connectivity) to data stores that is received from the hosts. The high availability manager 296 can then identify whether any of the hosts or data stores are malfunctioning based on the aggregated results. For example, if host 276 has lost access to data store 292, but host 280 and host 278 still have access to data store 292, then high availability manager 296 may identify there to be a problem with host 276. On the other hand, if each of the hosts has lost access to data store 292, high availability manager 296 may determine that there is a problem with the data store 292. Similarly, if only host 276 has lost connection to data store 292 via a first path, but host 280 and host 278 still have access to the data store 292 via the first path, then it can be determined that the host 276 is malfunctioning. However, if both host 276 and host 278 have lost access to data store 292 via the first path, it may be determined that the data store 292 is malfunctioning.

Note that not all hosts may be configured to have access to all data stores. For example, host 276 is not configured to have access to data store 294. In one embodiment, high availability manager 296 aggregates data store access of hosts that are configured to have access to a specific data store. For example, when determining whether one or more hosts or data store 294 is malfunctioning based on the connection status between the hosts and data store 294, high availability manager 296 would not consider the status of host 276 because host 276 is not configured to have access to data store 294.

In one embodiment, if high availability manager 296 determines that a host is malfunctioning, the high availability manager 296 migrates virtual machines running on that host (if any are present) to other hosts. Alternatively, or in addition, other applications, programs or processes may be migrated between hosts. In one embodiment, virtual machines (or other applications, processes, etc.) are migrated off of a host if the host has lost all access to a data store. In such an embodiment, if there is at least one available path to the data store (e.g., for a multi-path data store), no migration may occur.

To migrate a virtual machine, the high availability manager 296 saves a state of the virtual machine. The high availability manager 296 then starts a new virtual machine on a different host using the saved state. Once the new virtual machine is up and running, the high availability manager 296 may redirect a client that is using the original virtual machine to the new virtual machine. The original virtual machine can then be shut down. Migration can occur with little to no interruption to the client. Once all of the virtual machines are migrated to other hosts, a malfunctioning host may be shut down for maintenance or replacement. Other applications, processes, etc. may also be migrated between hosts in a similar manner.

In one embodiment, the virtual machines (or applications, processes, etc.) are live migrated to other hosts. Live migration of a VM is the transfer of the VM from one host to another host, while the guest OS of the VM continues to run. Live migration provides minimal interruption and service downtime to the VM and its end user.

In the illustrated example, host 276 includes a storage manager 290. The storage manager 290 in one embodiment, manages data store 292. The storage manager 290 may be responsible for receiving instructions from virtual machines that are meant for data store 292, and performing operations on data in the data store 292 based on the instructions. The instructions may be received from VMs on the host hosting the storage manager and/or from VMs on other hosts. In one embodiment, if high availability manager 296 determines that a host that is hosting a storage manager 290 is malfunctioning, the high availability manager 296 also migrates the storage manager 290.

In the example shown in FIG. 2, host controller 274 has determined that host 276 is malfunctioning. Consequently, host controller 274 will migrate virtual machine 282 to host 280, and will migrate VM 284 and storage manager 290 to host 278. Note that high availability manager 296 has distributed VM 282 and VM 284 between host 280 and host 278 in a load balanced manner.

Figure 3:
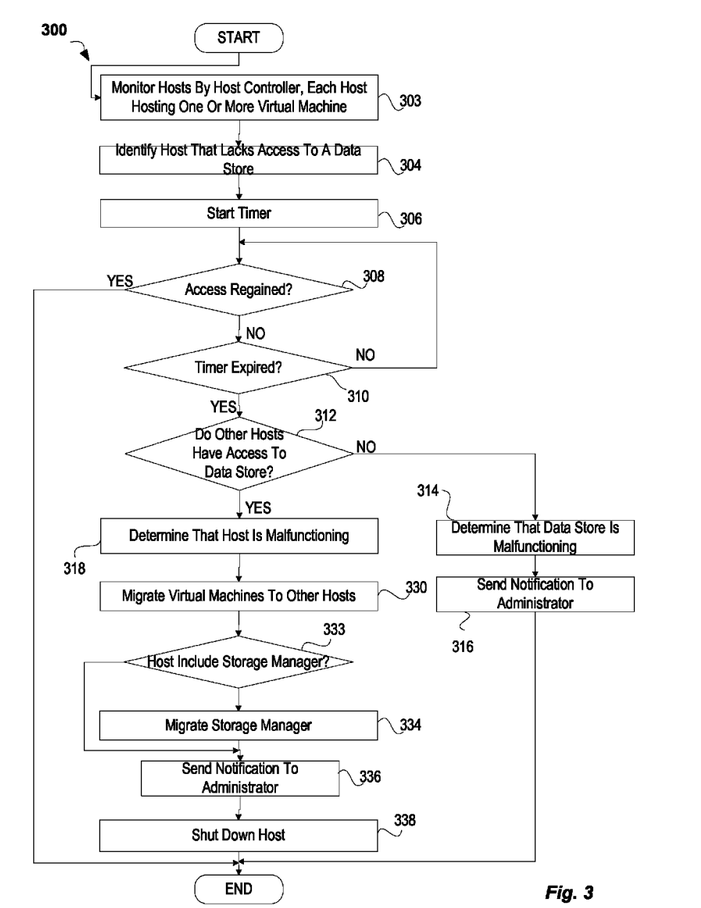

FIG. 3 is a flow diagram illustrating a method 300 for one embodiment of identifying and analyzing network storage problems. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by a host controller (e.g., host controller 145 of FIG. 1 or host controller 274 of FIG. 2). In another embodiment, method 300 is performed by a host controller and a host (e.g., host 140 of FIG. 1) operating cooperatively.

Referring to FIG. 3, at block 303 a host controller monitors one or more hosts. Each of the monitored hosts may include one or more virtual machines operating thereon.

The host controller identifies a host that lacks access to a data store at block 304. The host may lack access to only a single storage device, or may lack access to an entire storage domain. A host lacks access to a data store if it is no longer able to communicate with the data store (e.g., if it does not receive any data from the data store). For multi-path data stores, access is lost when the host cannot communicate with the data store via any of the paths. A host may determine that it lacks access to a data store by attempting, and failing, to communicate with the data store.

In one embodiment, hosts send notifications to the host controller when they lose access to a data store. Alternatively, hosts may send periodic updates that include information on connectivity to data stores regardless of whether or not the hosts currently have access. In another embodiment, the host controller polls hosts periodically to determine a connectivity status of each host.

At block 306, the host controller starts a timer. At block 308, the host controller determines whether access to the data store has been regained by the host. If access has been regained, the method ends. If access has not been regained, the method proceeds to block 310, and the host controller determines whether the timer has timed out. If the timer has not yet timed out, the method returns to block 308. If the timer has timed out, the method proceeds to block 312.

At block 312, the host controller determines whether any other hosts have access to the data store. In one embodiment, the host controller compares connectivity data received from the identified host to connectivity data previously received from other hosts. Alternatively, the host may poll the other hosts to determine whether or not they have access to the data store. If other hosts do have access to the data store, the method continues to block 318. If the other hosts do not have access to the data store, then the method continues to block 314.

At block 314, the host controller determines that the data store is malfunctioning. At block 316, the host controller sends a notification to an administrator indicating that the data store is malfunctioning (referred to herein as a data store error notification). In one embodiment, the host controller causes the data store to be shut down.

At block 318, the host controller determines that the host is malfunctioning. Accordingly, at block 330, the host controller migrates virtual machines (or other applications, processes, etc.) that are running on the malfunctioning host to other hosts. In one embodiment, the virtual machines (or other processes, applications, etc.) are live migrated to other hosts. In some instances, it may not be possible to migrate all of the virtual machines from the malfunctioning host to other hosts. This may occur, for example, if the other hosts do not have bandwidth to host another virtual machine. In such an occurrence, those virtual machines that can be migrated are migrated, and the remaining virtual machines may be suspended. In one embodiment, suspending a virtual machine includes saving a state of the virtual machine and shutting the virtual machine down until it can be restarted on another host.

At block 333, the host controller determines whether the host that is malfunctioning includes a storage manager. If the host does include a storage manager, than the method proceeds to block 334, and the storage manager is also migrated to another host. Otherwise, the method proceeds to block 336.

At block 336, a notification is sent to the administrator that the host is malfunctioning (referred to herein as a host error notification). A block 338, the host is shut down. The method then ends.

Figure 4:
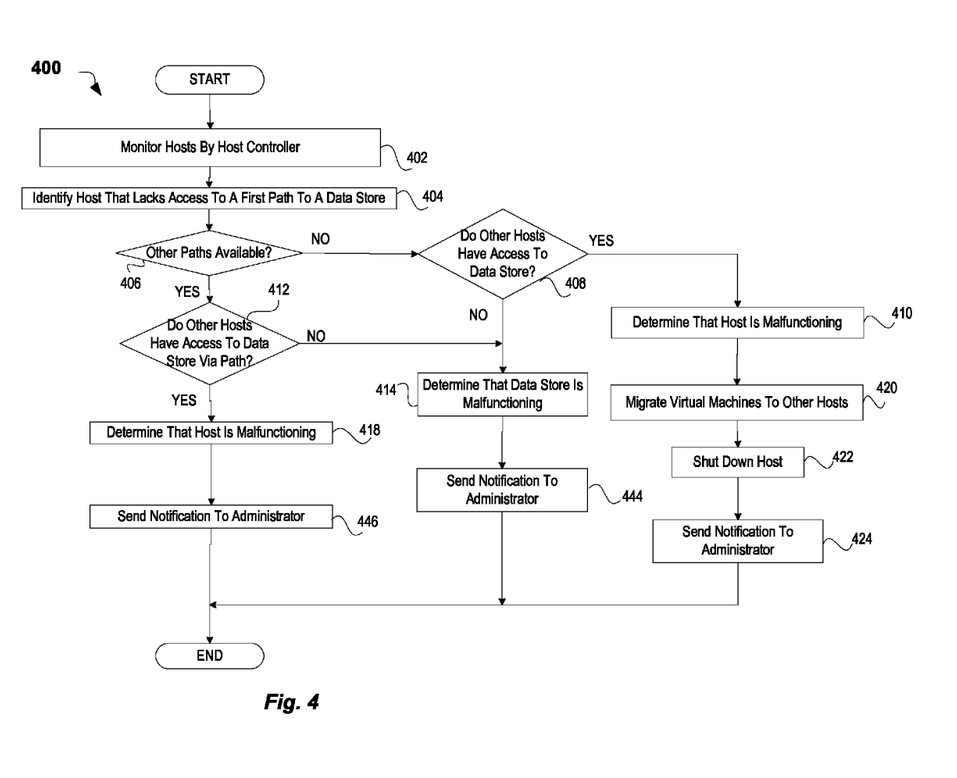

FIG. 4 is a flow diagram illustrating a method 400 for another embodiment of identifying and analyzing network storage problems. Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by a host controller (e.g., host controller 145 of FIG. 1 or host controller 274 of FIG. 2). In another embodiment, method 400 is performed by a host controller and a host (e.g., host 140 of FIG. 1) operating cooperatively.

Referring to FIG. 4, at block 402 a host controller monitors one or more hosts. Each of the monitored hosts may include one or more virtual machines operating thereon. The monitored hosts may also include other applications, processes, services, etc. operating thereon. The hosts are connected to a multi-path data store that includes two or more paths to the hosts.

At block 404, the host controller identifies a host that lacks access to a first path to the data store. At block 406, the host controller determines whether there are any additional paths to the data store that are available to the identified host. If there are no additional paths available, the method continues to block 408. If additional paths are available to the host, the method continues to block 412.

At block 408, the host controller determines whether the other hosts have access to the data store (e.g., via the first path of via an additional path). If other hosts do have access to the data store, the method continues to block 410. If other hosts do not have access to the data store, the method continues to block 414.

At block 410, the host controller determines that the host is malfunctioning. At block 420, the host controller migrates virtual machines (or other processes, applications, etc.) running on the host to other hosts. This may be done in a load balanced manner and may be a live migration. At block 422, the host controller shuts down the host. At block 424, the host controller sends a notification to the administrator that the host has malfunctioned, and that it was shut down.

At block 412, the host controller determines whether any other hosts have access to the data store via the first path. If other hosts do have access to the data store via the first path, the method continues to block 418. If the other hosts do not have access to the data store via the first path, then the method continues to block 414.

At block 414, the host controller determines that the data stored is malfunctioning. At block 444, the host controller sends a notification to the administrator that the data store is malfunctioning.

At block 418, the host controller determines that the host is malfunctioning. At block 446, the host controller sends a notification that the host is malfunctioning to the administrator. The method than ends.

Figure 5:
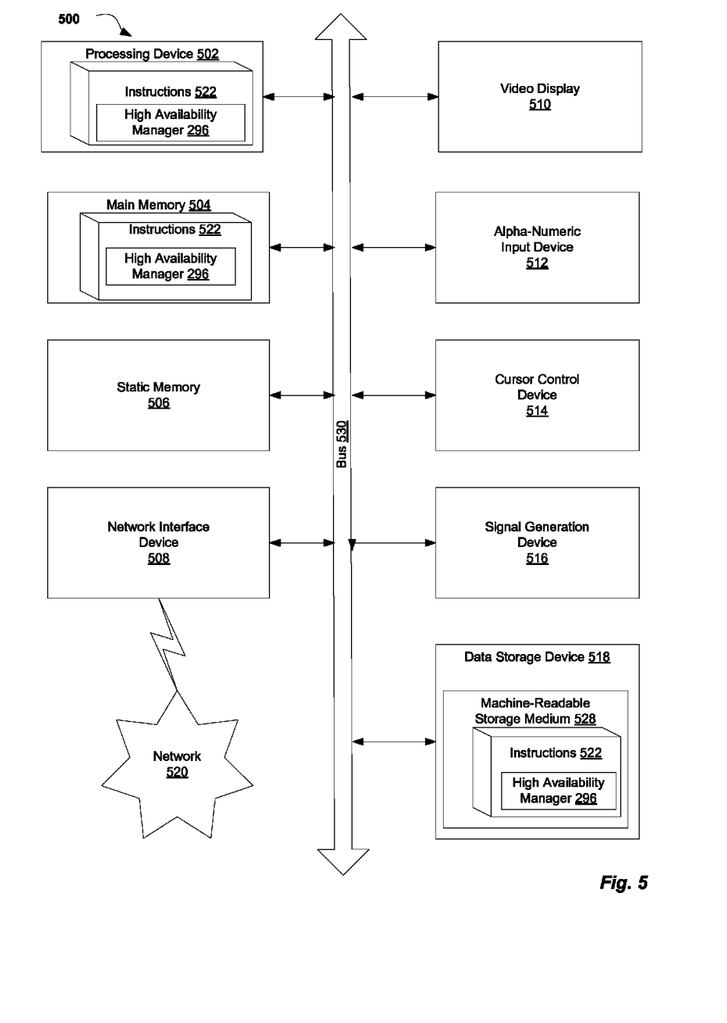

FIG. 5 illustrates a diagrammatic representation of a machine in the exemplary form of a computer system 500 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., instructions 522) for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-readable storage media.

The machine-readable storage medium 528 may also be used to store instructions for a high availability storage manager (e.g., high availability storage manager 296 of FIG. 2), and/or a software library containing methods that call the high availability manager. While the machine-readable storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

monitoring a plurality of hosts by a computing device via a network, wherein each of the plurality of hosts hosts one or more virtual machines and is coupled to a multi-path data store via the network;

upon identifying, by the computing device, that a first host of the plurality of hosts does not have access to the multi-path data store via a first path, determining, by the computing device, whether other hosts of the plurality of hosts have access to the multi-path data store via the first path;

when the other hosts do have access to the multi-path data store via the first path, performing the following by the computing device:

determining that the first host is malfunctioning and sending a host error notification to an administrator;

performing a live migration to migrate the one or more virtual machines hosted by the first host to the other hosts; and shutting down the first host; and when the other hosts do not have access to the multi-path data store via the first path, determining that the multi-path data store is malfunctioning.

2. The method of claim 1, further comprising:

starting a timer upon identifying that the first host does not have access to the multi-path data store; and determining whether the other hosts have access to the multi-path data store when the timer times out.

3. The method of claim 1, further comprising:

when the other hosts do not have access to the multi-path data store, determining that the multi-path data store is malfunctioning and sending a data store error notification to the administrator.

4. The method of claim 1, further comprising:

identifying that the first host does not have access to the multi-path data store upon receiving a notification from the first host that the first host cannot communicate with the multi-path data store.

5. The method of claim 1, further comprising:

determining whether the first host has access to the multi-path data store via an additional path; and migrating virtual machines hosted by the first host to other the hosts if the first host is malfunctioning and the first host does not have access to the multi-path data store via the first path or the additional path.

6. A non-transitory computer readable storage medium including instructions that, when executed by a processing device, cause the processing device to perform operations comprising:

monitoring a plurality of hosts by a computing device via a network, wherein each of the plurality of hosts hosts one or more virtual machines and is coupled to a multi-path data store via the network;

upon identifying, by the computing device, that a first host of the plurality of hosts does not have access to the multi-path data store via a first path, determining, by the computing device, whether other hosts of the plurality of hosts have access to the multi-path data store via the first path; and when the other hosts do have access to the multi-path data store via the first path, performing the following by the computing device:

determining that the first host is malfunctioning and sending a host error notification to an administrator;

performing a live migration to migrate the one or more virtual machines hosted by the first host to the other hosts; and shutting down the first host; and when the other hosts do not have access to the multi-path data store via the first path, determining that the multi-path data store is malfunctioning.

7. The non-transitory computer readable storage medium of claim 6, the operations further comprising:

starting a timer upon identifying that the first host does not have access to the multi-path data store; and determining whether the other hosts have access to the multi-path data store when the timer times out.

8. The non-transitory computer readable storage medium of claim 6, the operations further comprising:

when the other hosts do not have access to the multi-path data store, determining that the multi-path data store is malfunctioning and sending a data store error notification to the administrator.

9. The non-transitory computer readable storage medium of claim 6, the operations further comprising:

identifying that the first host does not have access to the multi-path data store upon receiving a notification from the first host that the first host cannot communicate with the multi-path data store.

10. The non-transitory computer readable storage medium of claim 6, the operations further comprising:

determining whether the first host has access to the multi-path data store via an additional path; and migrating virtual machines hosted by the first host to other the hosts if the first host is malfunctioning and the first host does not have access to the multi-path data store via the first path or the additional path.

11. An apparatus comprising:

a memory to store instructions for a high availability manager; and a processor, connected to the memory, the processor to execute the instructions, wherein the instructions cause the processor to:

monitor a plurality of hosts via a network, wherein each of the plurality of hosts hosts one or more virtual machines and is coupled to a multi-path data store via the network;

upon identifying that a first host of the plurality of hosts does not have access to the multi-path data store via a first path, determine whether other hosts of the plurality of hosts have access to the multi-path data store via the first path; and when the other hosts do have access to the multi-path data store via the first path, determine that the first host is malfunctioning, send a host error notification to an administrator, perform a live migration to migrate the one or more virtual machines hosted by the first host to the other hosts, and shut down the first host; and determine that the data store is malfunctioning when the other hosts do not have access to the multi-path data store via the first path.

12. The apparatus of claim 11, the instructions further to cause the processor to:

start a timer upon identifying that the first host does not have access to the multi-path data store; and determine whether the other hosts have access to the multi-path data store when the timer times out.

13. The apparatus of claim 11, the instructions further to cause the processor to:

determine that the multi-path data store is malfunctioning when the other hosts do not have access to the multi-path data store and send a data store error notification to the administrator.

14. The apparatus of claim 11, the instructions further to cause the processor to:

identify that the first host does not have access to the multi-path data store upon receiving a notification from the first host that the first host cannot communicate with the multi-path data store.

15. The apparatus of claim 11, the instructions further to cause the processor to:

determine whether the first host has access to the multi-path data store via an additional path; and migrate virtual machines hosted by the first host to other the hosts if the first host is malfunctioning and the first host does not have access to the multi-path data store via the first path or the additional path.

16. The method of claim 1, further comprising:
    determining that not all virtual machines running on the first host can be migrated to the other hosts; and
    suspending those virtual machines running on the first host that cannot be migrated.

17. The non-transitory computer readable storage medium of claim 6, the method further comprising:
    determining that not all virtual machines running on the first host can be migrated to the other hosts; and
    suspending those virtual machines running on the first host that cannot be migrated.

18. The apparatus of claim 11, the instructions further to cause the processor to:
    determine that not all virtual machines running on the first host can be migrated to the other hosts; and
    suspend those virtual machines running on the first host that cannot be migrated.

* * * * *